(12) United States Patent
Beck

(10) Patent No.: US 11,504,285 B2
(45) Date of Patent: Nov. 22, 2022

(54) WHEELCHAIR LIFT BRIDGE PLATE CATCH

(71) Applicant: ROXANA DEVELOPMENTS LIMITED, Whitstable (GB)

(72) Inventor: Adam Beck, Droitwich (GB)

(73) Assignee: ROXANA DEVELOPMENTS LIMITED, Whitstable (GB)

( * ) Notice: Subject to any disclaimer, the term of this patent is extended or adjusted under 35 U.S.C. 154(b) by 0 days.

(21) Appl. No.: 17/034,072

(22) Filed: Sep. 28, 2020

(65) Prior Publication Data

US 2021/0100700 A1  Apr. 8, 2021

(30) Foreign Application Priority Data

Oct. 2, 2019  (GB) ..................... 1914212

(51) Int. Cl.
*A61G 3/06* (2006.01)
*B60P 1/44* (2006.01)

(52) U.S. Cl.
CPC ............ *A61G 3/062* (2013.01); *B60P 1/4407* (2013.01); *B60P 1/4457* (2013.01); *B60P 1/4478* (2013.01)

(58) Field of Classification Search
CPC ...... A61G 3/062; B60P 1/4407; B60P 1/4414; B60P 1/4457; B60P 1/4471; B60P 1/4478
See application file for complete search history.

(56) References Cited

U.S. PATENT DOCUMENTS

| | | | | |
|---|---|---|---|---|
| 5,605,431 A * | 2/1997 | Saucier | ................. | B60P 1/4471 |
| | | | | 414/546 |
| 6,203,266 B1 * | 3/2001 | Savaria | ................. | B60P 1/4457 |
| | | | | 414/546 |
| 6,461,097 B1 * | 10/2002 | Ablabutyan | ............. | A61G 3/06 |
| | | | | 414/546 |
| 10,195,977 B2 * | 2/2019 | Bettcher, III | ......... | A61G 3/062 |
| 10,426,673 B2 * | 10/2019 | Budd, II | ................ | B60P 1/4457 |
| 10,898,395 B2 * | 1/2021 | Kline | ..................... | A61G 3/062 |
| 2005/0238471 A1 | 10/2005 | Ablabutyan et al. | | |
| 2007/0071569 A1 | 3/2007 | Sobota et al. | | |

FOREIGN PATENT DOCUMENTS

| | | |
|---|---|---|
| AU | 199925008 A1 | 4/1999 |
| EP | 0955029 A2 | 11/1999 |
| GB | 2455053 A * | 6/2009 ................ B60P 1/44 |

OTHER PUBLICATIONS

Search Report issued in Great Britain Application No. GB1914212.4 dated Jan. 16, 2020; 4 pages.

* cited by examiner

*Primary Examiner* — James Keenan
(74) *Attorney, Agent, or Firm* — Wegman Hessler

(57) ABSTRACT

A wheelchair lift for a vehicle having a base for securing to a vehicle; a platform for accommodating a wheelchair; a lifting arm connected to the base and moveable between a raised position and a lowered position; a support arm connected between the lifting arm and the platform; a bridge plate connected to the platform and pivotable between a raised position and a lowered position; a platform folding linkage connected to the platform and arranged to contact the lifting arm during movement of the lifting arm between the raised position and the stowed position to raise the platform from a deployed position to a stowed position; a bridge plate control link connected between the bridge plate and the platform folding linkage; and a latch mounted on the bridge plate control link and arranged to latch the bridge plate in a raised condition.

12 Claims, 4 Drawing Sheets

WHEELCHAIR LIFT BRIDGE PLATE CATCH

FIELD OF INVENTION

The present invention relates to vehicle-mounted wheelchair lifts, and in particular to the securing of bridge plates in such lifts.

BACKGROUND OF THE INVENTION

Foldable wheelchair lifts provide a moveable platform upon which a wheelchair may be raised and lowered between ground level and a level at which the wheelchair may be wheeled into or out from the vehicle. Such lifts are generally mounted on or inside the vehicle itself and are deployed out from a door in the side or the rear of the vehicle when needed, for example using a hydraulic actuating mechanism.

A bridge plate, which is also referred to as an inner barrier, is typically mounted on the platform, at its inboard edge nearest the vehicle, and arranged to deploy to a flat position when the lift is raised to bridge the gap between the platform and the vehicle, and to fold up into a raised vertical position so as to form a barrier preventing the wheelchair from rolling off the inboard edge of the platform when the platform is in its lowered position or moving between its raised and lowered positions. Various systems have been devised to lock the bridge plate in its raised position so that it provides a sufficiently strong barrier to movement of the wheelchair. These typically involve locking mechanisms close to the pivot axis of the bridge plate which are therefore not particularly strong.

SUMMARY OF THE INVENTION

According to a first aspect of the disclosed technology, there is provided a wheelchair lift for a vehicle. In some embodiments, the wheelchair lift may comprise a base for securing to a vehicle. In some embodiments, the wheelchair lift comprises a platform for accommodating a wheelchair. In some embodiments, the wheelchair lift comprises a lifting arm connected to the base and moveable between a raised position and a lowered position so as to move the platform between a raised position and a lowered position. In some embodiments, the wheelchair lift may comprise a support arm connected between the lifting arm and the platform.

In some embodiments, the wheelchair lift comprises a bridge plate connected to the platform and pivotable between a raised position and a lowered position. In some embodiments, the wheelchair lift may comprise a platform folding linkage connected to the platform and arranged to contact the lifting arm during movement of the lifting arm between the raised position and the stowed position to raise the platform from a deployed position to a stowed position. In some embodiments, the wheelchair lift may comprise a bridge plate control link connected between the bridge plate and the platform folding linkage. In some embodiments, the wheelchair lift comprises and a latch, which may be mounted on the bridge plate control link, and is arranged to latch the bridge plate in its raised condition.

In some embodiments, the platform folding linkage may comprise a first link pivotably connected to the platform and a second link pivotably connected to the support arm and to the first link. In some embodiments, the bridge plate control link may be connected to the first link. In some embodiments, the first link may comprise a first part connected to the platform and a second part arranged to move relative to the first part. Such movement may be arranged to vary the effective length of the first link. In some embodiments, the second part may be connected to the second link.

In some embodiments, the bridge plate control link may be connected to the first part of the first link whereby movement of the first part relative to the second part is arranged to allow the bridge plate to move relative to the platform between its raised and lowered conditions.

In some embodiments, the wheelchair lift may further comprise a latch release member mounted on the first part of the first link and arranged to release the latch on movement of the first part relative to the second part.

In some embodiments, the bridge plate control link may be connected to the platform folding linkage by means of a sliding connection. In some embodiments, the sliding connection may be arranged to allow movement of the latch release member relative to the latch when the first part of the first link moves relative to the second part of the first link.

In some embodiments, the lifting arm may be further movable to a stowed position thereby to move the platform to a stowed position. In some embodiments, the sliding connection may be arranged to allow the platform to rotate relative to the bridge plate as the platform folding linkage raises the platform from its deployed position towards a stowed position.

In some embodiments, the bridge plate, while in its raised condition, may be movable between a fully raised position and a latched position. In the latched position the latch may prevent further movement of the bridge plate away from the fully raised position.

In some embodiments, the wheelchair lift may comprise a detector arranged to detect movement of the bridge plate out of its fully raised position. In some embodiments, it may further comprise a control unit connected to the detector, arranged to control the raising and lowering of the lift. The control unit may be arranged, on detection of movement of the bridge plate out of its fully raised position, to modify its control of the lift.

The present technology further provides a wheelchair lift for a vehicle. In some embodiments, the wheelchair lift may comprise a base for securing to a vehicle. In some embodiments, the wheelchair lift may comprise a platform for accommodating a wheelchair. In some embodiments, the wheelchair lift may comprise a lifting arm connected to the base and moveable between a raised position and a lowered position so as to move the platform between a raised position and a lowered position. In some embodiments, the wheelchair lift may comprise a support arm connected between the lifting arm and the platform. In some embodiments, the wheelchair lift may comprise a bridge plate connected to the platform and pivotable between a raised position and a lowered position. In some embodiments, the wheelchair lift may comprise a detector arranged to detect movement of the bridge plate out of its raised position and a control unit connected to the detector, arranged to control the raising and lowering of the lift. In some embodiments, the control unit may be further arranged, on detection of movement of the bridge plate out of its raised position, to modify its control of the lift.

In some embodiments, on detection of movement of the bridge plate out of its raised position, the control unit may be arranged to stop movement of the lift, or to limit movement of the lift for example by limiting the distance through which it is moved or the speed at which it is moved.

In some embodiments, the lift assembly may further comprise, in any workable combination, any one or more features of the preferred embodiments of the invention which are shown by way of example only in the accompanying drawings.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which.

DETAILED DESCRIPTION OF EXEMPLARY EMBODIMENTS

Figure 1A:
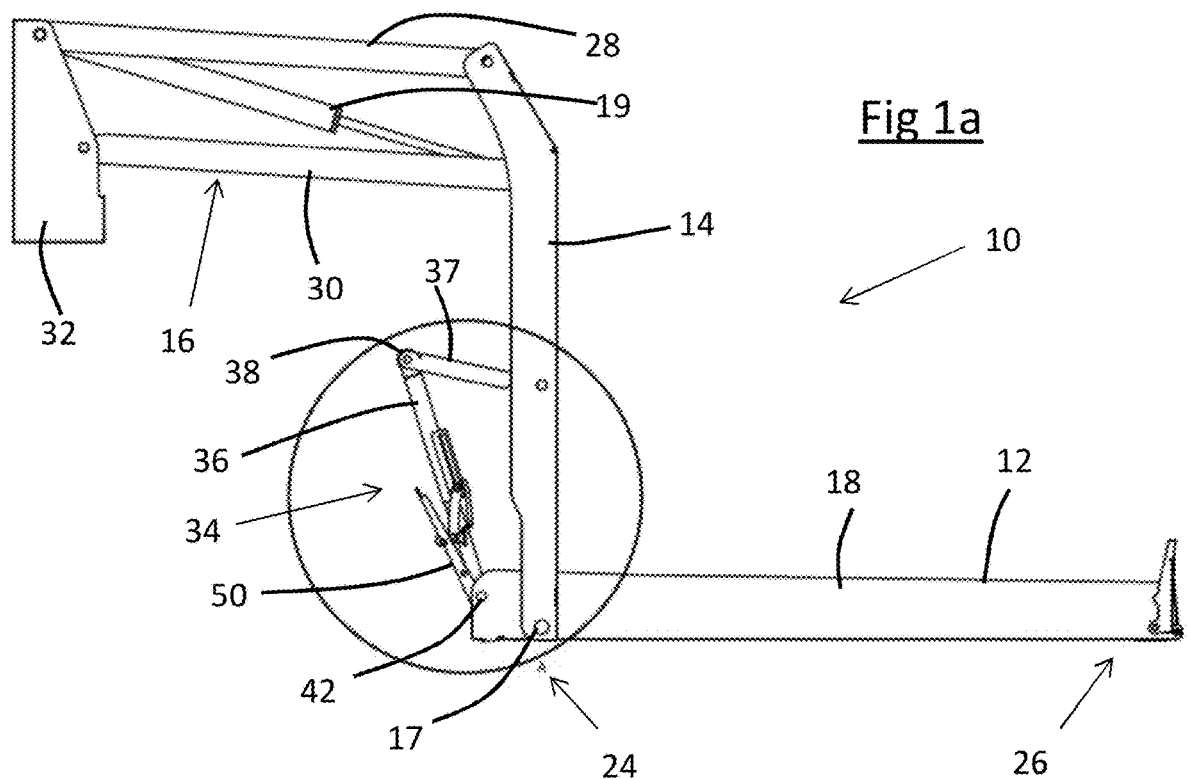
FIGS. 1a and 1b show a side view of a wheelchair lift according to an embodiment of the present technology in a lowered configuration.

Referring to FIGS. 1-5, a wheelchair lift 10 according to an embodiment of the invention comprises a lift platform assembly 12, a pair of support arms 14 which are arranged substantially vertically with the platform 12 supported between their lower ends, and a pair of lifting assemblies 16, each connecting the upper end of one of the support arms 14 to a respective mounting turret 32 which in turn is mounted on the floor of a vehicle forming a base for the lift. The platform assembly 12 is pivotably mounted on each of the support arms so that it can pivot about a pivot axis 17 between a generally horizontal deployed position as shown in the figures and a generally vertical stowed position.

Figure 4A:
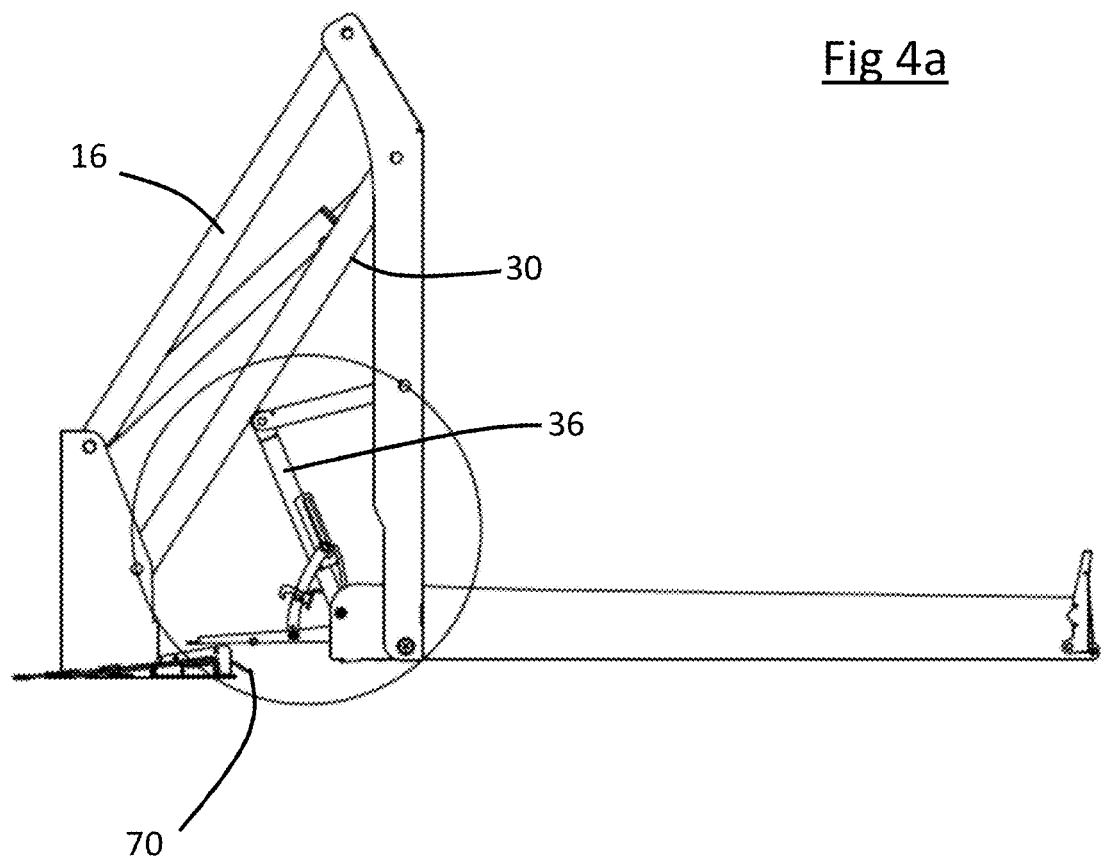
FIGS. 4a and 4b show a side view of the wheelchair lift of FIGS. 1a and 1b in a fully raised configuration.

The lifting assemblies 16 are hydraulically actuated by a hydraulic strut 19 to move the lift 10 between a deployed configuration, in which the platform assembly 12 is arranged to provide a substantially horizontal platform 18 upon which a wheelchair may be accommodated and a stowed configuration (not shown), in which the platform assembly 12 is folded away and is stowed within the vehicle upon which the wheelchair lift 10 is mounted in a substantially vertical arrangement. In the deployed configuration, the platform assembly 12 is movable between a lowered position, as shown in FIG. 1a, in which the platform assembly 12 rests on, or is in close proximity to, the ground and in which a wheelchair can be wheeled between the ground and the platform 18, and a raised position, as shown in FIG. 4a, in which the platform assembly 12 is approximately level with the floor of the vehicle and in which the wheelchair may be wheeled between the platform 18 and the internal floor of the vehicle.

Typically, the wheelchair lift 10 will be mounted in a vehicle, such as a minibus, to raise and lower a wheelchair and its occupant between the ground and the inside of the vehicle. The most common arrangement is for the wheelchair lift 10 to be mounted at the rear of the vehicle so that it may be deployed through doors on the back of the vehicle. Accordingly, the frame of reference used in the following description assumes such a configuration. For example, the right and left sides of the lift 10 are those that face the left and right sides of the vehicle when looking forwards. Of course, other mounting configurations are possible, for example so that the lift 10 deploys out from the side of the vehicle. The "front" or "inboard" side 24 of the lift 10 is therefore the side that faces into the vehicle and the "rear" or "outboard" side 26 of the lift 10 is the side that faces out of the vehicle, i.e. in the direction in which the platform assembly 12 extends away from the support arms 14 when the lift 10 is in the deployed configurations.

The lift 10 typically comprises right and left lifting assemblies 16. However, it is possible for the wheelchair lift 10 to comprise only a single lifting assembly 16 and associated support arm 14. For example, only the left or right lifting assembly 16 need be present. However, having both left and right lifting assemblies 16 improves the stability of the lift 10. Each lifting assembly 16 may comprise an upper lifting arm 28 and a lower lifting arm 30, which are arranged substantially parallel to each other. Each of the upper 28 and lower 30 lifting arms is typically pivotably connected at its lower (inboard) end to a mounting turret 32, the upper lifting arm 28 being connected to the mounting turret 32 at a point above the lower lifting arm 30. The turret or turrets 32 therefore form at least part of a base which is mounted on the vehicle to connect the lift assembly to the vehicle. The upper (outboard) end of each of the lifting arms 28, 30 may be pivotably connected to the upper end of one of the support arms 14, again with the upper lifting arm 28 being connected to the support arm at a point above the lower lifting arm 30 so as to form a parallelogram linkage. The lifting assemblies 16 generally each comprise at least one hydraulic strut arranged to actuate the parallelogram linkage, which in turn causes the lift 10 to raise and lower between the stowed, raised, and lowered configurations.

A platform folding linkage 34 is provided on at least one side of the lift assembly. The platform folding linage may comprise a first link 36 and a second link 37. The first link 36 is pivotably connected to the inboard end of the platform 18, inboard of the pivot axis 17 and extends generally upwards from the platform. The second link 37 is pivotably connected to the upper end of the first link 36 and to the support arm 14 at a point above the pivot axis 17. A bearing surface 38 is formed on the linkage 34 at the upper end of the first link 36, which is arranged to engage with the underside of the lower lifting arm 30 as the lift is raised as will be described in more detail below. The first link 36 is formed in two parts: a lower first part 36a which is connected to the platform 18 and an upper second part 36b which is connected to the second link 37. The two parts 36a, 36b of the first link are slidable relative to each other between an extended condition and a contracted condition, so that the effective length of the first link 36 (i.e. the distance between the bearing surface 38 and the pivot axis of the connection between the first link 36 and the platform 18) is variable between an extended length and a contracted length. The two parts 36a, 36b are spring biased towards the extended condition, for example by means of a gas spring.

The platform assembly also comprises a bridge plate 40, which is pivotably connected to the inboard end of the platform 18 so that it can pivot about a horizontal axis 42 adjacent to the proximal (inboard) edge of the platform 12. This axis may be coincident with the axis of rotation of the first part 36a of the first link 36 relative to the platform 18, but this is not critical. The bridge plate 40 is movable between a lowered, substantially horizontal position and a raised, substantially vertical, position. In the lowered position it is arranged to bridge the gap between the floor of the vehicle and the inboard edge of the platform 18 when the lift 10 is in the raised configuration, as shown in FIG. 4a, thereby allowing a wheelchair to be wheeled between the platform 12 and the floor of the vehicle. In its raised position the bridge plate 40 extends upwards from the inboard edge of the platform 18 to prevent the wheelchair from rolling off the inboard end of the platform 18. A bridge plate control link 46 is connected between the bridge plate and the upper part 36b of the first link 36 to control raising and lowering of the bridge plate 40.

Figure 1B:
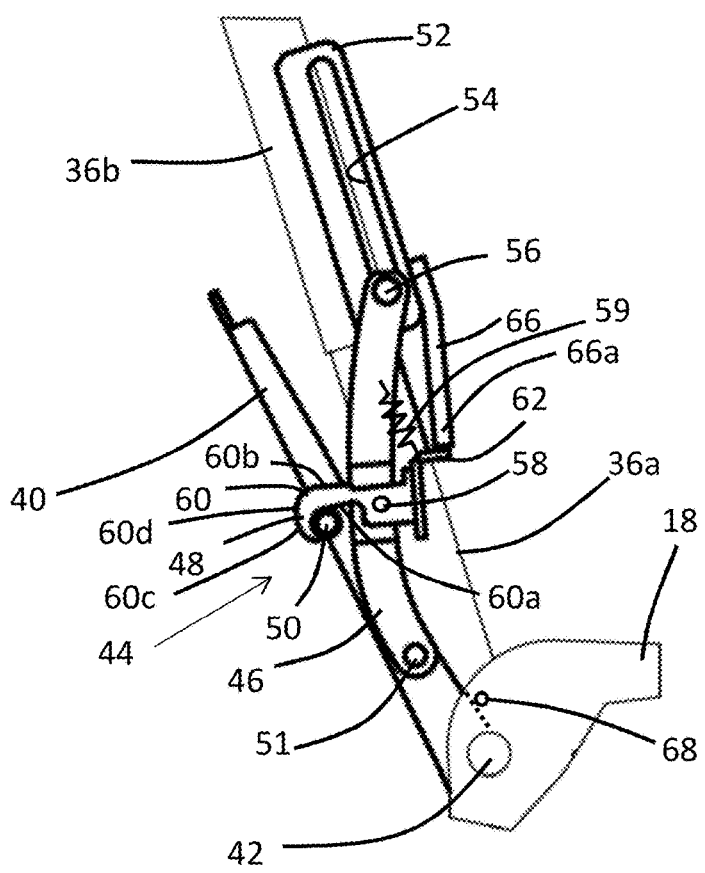

A bridge plate latching mechanism 44 comprises a latch 48 mounted on the bridge plate control link 46. The latch 48 is in the form of a hook and is pivotably mounted on the bridge plate control link 46 and arranged to releasably engage with a pin 50 on the bridge plate to latch the bridge plate in its raised position. The latch 48 is pivotable between a latching position as shown in FIG. 1b in which it can engage the pin 50 to latch the bridge plate in its raised position, and a releasing position as shown in FIG. 3b and described below. A latch return spring 59 is arranged to bias the latch 48 towards its latching position. For example, the return spring 59 may be a tension spring connected between the latch 48 and the bridge plate control link 46. The lower end of the bridge plate control link 46 is pivotally connected to the side of the bridge plate 40 at a point 51 spaced from the pivot axis 42 of the bridge plate, between the pivot axis 42 and the latch pin 50. The upper end of the bridge plate control link 46 is pivotally and slidably connected to the upper part 36b of the first link 36 of the platform folding linkage. This is achieved by a mounting plate 52 which is mounted on the upper part 36b of the first link 36, and has a slot 54 formed in it which extends longitudinally along the first link 36. A sliding pin 56 extends through the bridge plate control link 46 and projects into the slot 54 so as to retain the upper end of the bridge plate control link 46 against the mounting plate 52 and allow it to slide along the mounting plate 52 and hence along the upper part 36a of the first link 36.

The latch 48 is pivotably mounted on the bridge plate control link 46 by means of pin 58. It has a latch hook 60 formed at one end, which is arranged to engage with the latch pin 50, and a release tab 62 formed at the other end, on the opposite side of the pin 58 from the hook 60, which has an upward facing abutment surface 64 (shown in FIG. 4b). A latch release member 66 is mounted on the upper part 36b of the first link 36, for example on the mounting plate 52 and projects downwards therefrom with its lower end 66a forming an abutment which is arranged to engage with the abutment surface 64 on the latch to release the latch. The hook 60 has an open side 60a which faces downwards and a closed side 60b which faces upwards, and a tip 60c of the hook has a rounded outer surface 60d the lower part of which can be engaged by the latch pin 50 to lift the latch hook 60 over the pin 50 thereby to latch the bridge plate 40 in its raised position as shown in FIG. 1b. A mounting portion 48a of the latch 48, which is mounted on the pin 58, and to which the hook 60 and release tab 62 are connected, is spaced from the inside of the hook tip 60c by a distance greater than the diameter of the latch pin 50. This means that the open side 60 of the hook has a recess formed in it which is longer than the diameter of the latch pin 50, which allows the bridge plate 40 to move while the latch 48 is in its latching position latching the bridge plate in its raised position.

Specifically, the bridge plate 40 as shown in FIG. 1b is slightly lowered from its fully raised position into a latched position where the hook 60c of the latch prevents further lowering of the bridge plate 40. In its fully raised position, the bridge plate 40 is rotated clockwise as seen in FIG. 1b, i.e. raised further from the latched position, so that the pin 50 is spaced from the inner surface of the tip 60c of the hook. It will be appreciated that the bridge plate 40 can move between its fully raised position and its latched position while the latch 48 remains in its latching position. However, in both the fully raised position and the latched position the bridge plate is in a raised condition in which it forms an inner barrier preventing a wheelchair from rolling off the inner side of the platform 18.

A bridge plate sensor 68, which may for example comprise a magnetic sensor, is arranged to sense movement of the bridge plate 40 between its fully raised position and its latched position. For example, as shown in FIG. 1b, the bridge plate sensor 68 may be mounted on the side of the lift platform 18 and positioned so that the bridge plate is aligned with it when in the fully raised position, but just offset from it when in the latched position. Alternatively, the sensor could be located so as to be aligned with the bridge plate 40 when in its latched position but not when in its fully raised position. Furthermore, other types of sensor may be used, such as a contact sensor arranged to be contacted by the bridge plate 40 when it is in its fully raised position. The function of the bridge plate sensor 68 will be described below with reference to FIG. 5.

When the lift is in its lowered position as shown in FIGS. 1a and 1b, the platform 18 is in its lowered position, so that its inboard end, inboard of the pivot axis 17 is at its highest position. The bridge plate 40 is in its fully raised position, and the latch hook 60 is in its latching position and engaged with the pin 50 on the bridge plate 40 to lock the bridge plate 40 in the raised condition, by preventing it from being lowered past the latched position as shown in FIG. 1b. The lower end 66a of the latch release member 66 is in contact with, or slightly spaced apart from, the latch release tab 62 on the latch. The compressible first link 36, via the mounting plate 52, pulls upwards on the upper end of the bridge plate control link 46, which pulls the bridge plate 40 away from the latched position shown in FIG. 1b into its fully raised position. The bearing surface 38 at the upper end of the first link 36 of the platform folding linkage 34 is spaced from the lower lifting arm 30, which is also approximately horizontal.

In this position, if a force is applied against the bridge plate 40 urging it out of its fully raised position, the bridge plate 40 can move to its latched position as shown in FIG. 1b at which point the latch 48 will stop its movement, retaining it in its raised condition. The bridge plate detector 68 will detect movement of the bridge plate out of its fully raised position, as will be described in more detail below.

Figure 2:
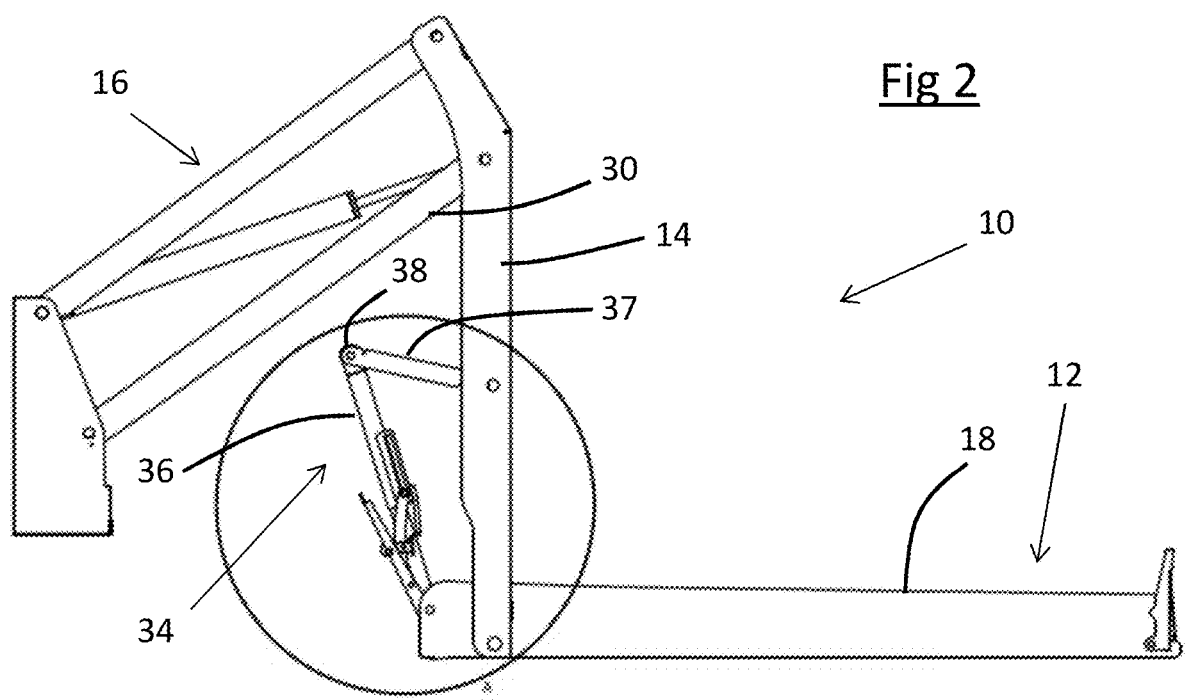
FIG. 2 shows a side view of the wheelchair lift of FIGS. 1a and 1b in a partially raised configuration.
Figure 3A:
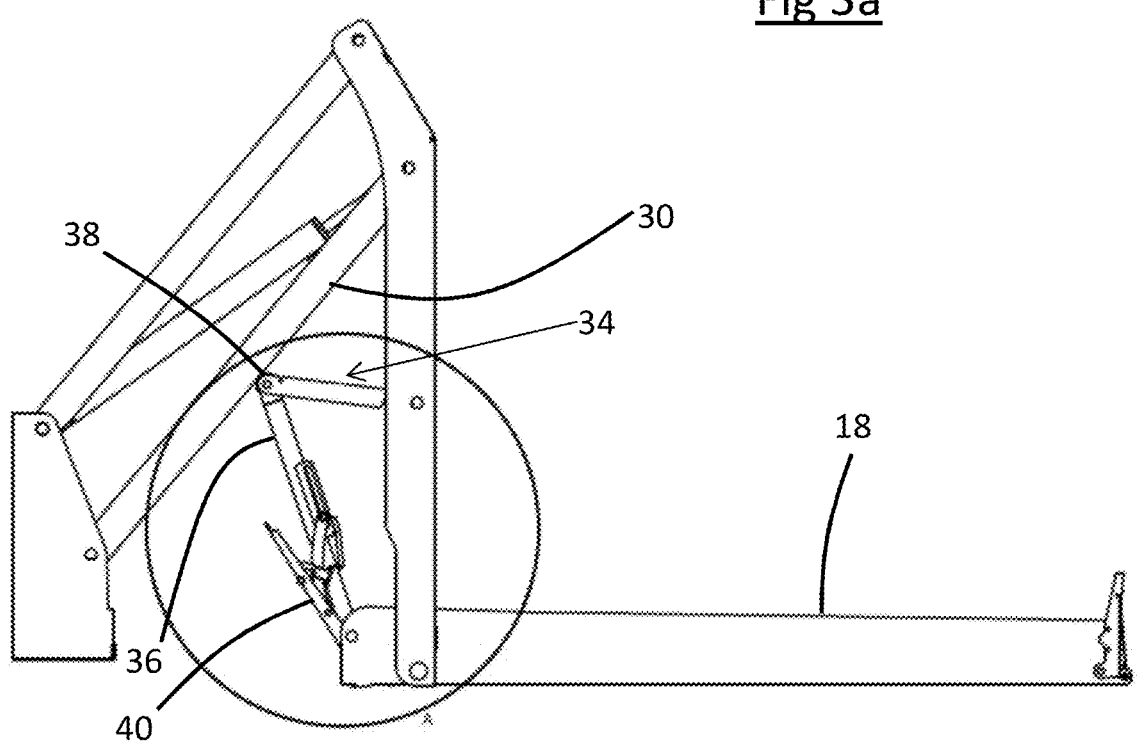
FIGS. 3a and 3b show a side view of the wheelchair lift of FIGS. 1a and 1b in a further partially raised intermediate configuration.
Figure 3B:
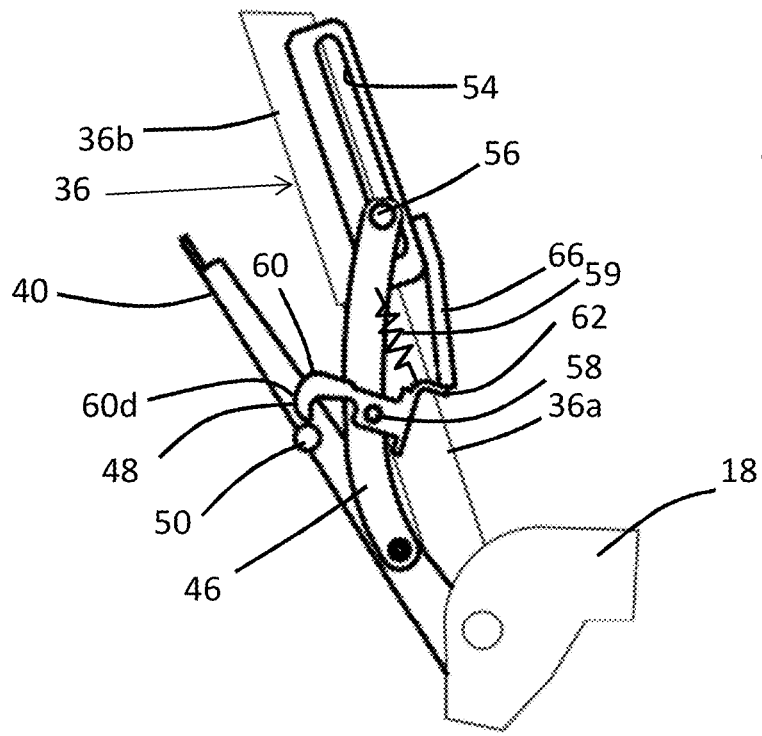

As shown in FIG. 2, as the lift is raised by the lifting assemblies 16 between its lowered position and an intermediate position which is shown in FIGS. 3a and 3b, the platform folding linkage 34 approaches but does not contact the lower lifting arm 30, and therefore the platform 18 remains in its horizontal lowered position and the bridge plate remains latched in its raised condition with the latching mechanism as shown in FIG. 1b. During this part of the lifts travel, the bridge plate will still be held in the fully raised position, and the bridge plate detector 68 will detect any movement of the bridge plate out of the fully raised position.

At an intermediate position, the bearing surface 38 on the platform folding linkage 34 contacts the underside of the lower lifting arm 30. Then as the lift is raised further, as shown in FIGS. 3a and 3b, the upper part 36b of the first part of the link 36 is pushed downward relative to the lower part 36a, towards the platform 18. Firstly, this allows the bridge plate 40 to move from its fully raised position to its latched position where its further movement is stopped by the latch hook 60. Then the upper end of the bridge plate control link 46 slides up the slot 54 in the mounting plate 52 so the bridge plate control link 46, and hence the pivot point 58 of the latch 48, remains stationary relative to the bridge plate 40, but the latch release member 66 pushes down on the latch release tab 62, lifting the latch hook 60 clear of the latch pin 50 against the return force of the latch return spring 59. This allows the bridge plate 40 to drop slightly from its raised position, pulling the bridge plate control link 46 downwards until the sliding pin 56 hits the bottom of the slot 54.

Figure 4B:
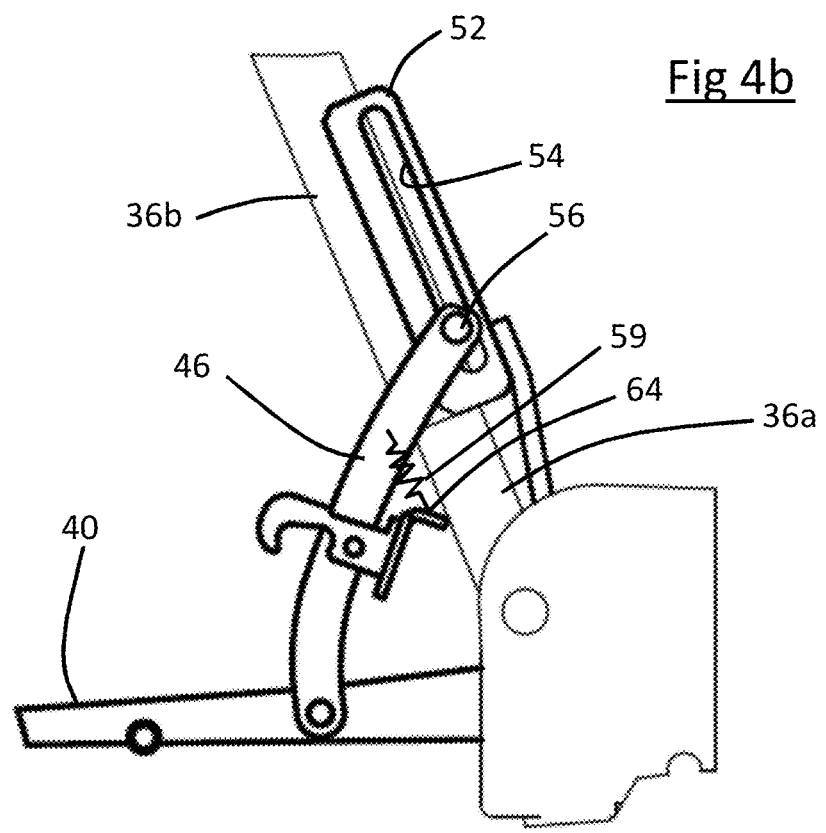

Referring to FIGS. 4a and 4b, further raising of the lift causes the lower lifting arm 30 to push down further on the upper part 36b of the first link. This compresses the first link 36, and lowers the mounting plate 52, which in turn allows the bridge plate control link 46 to move downwards and the bridge plate 40 to lower under its own weight towards its lowered position. As the lift approaches its fully raised position it moves in an inboard direction and the bridge plate 40 continues to be lowered until it lands on the edge 70 of the floor of the vehicle. The bridge plate is then in its lowered condition in which it acts as a bridge between the lift platform 18 and the vehicle floor. Over the final part of movement of the lift into its fully raised position, further compression of the link 36 is accommodated by the sliding pin 56 sliding up the slot 54 while the bridge plate 40 remains resting on the edge 70 of the vehicle floor and the platform 18 remains in its horizontal position.

From the raised position as shown in FIG. 4a, if the lifting assembly 16 is powered further upwards to move the lift to its stowed position, the lifting arms 28, 30 continue to rotate upwards about their lower ends moving the support arm 14 upwards and inboard. The first link 36 continues to be pushed downwards by the lower lifting arm 30 until it reaches the limit of its compression, and then starts to push down on the inboard end of the platform 18 thus tilting the outboard end of the platform up towards its stowed position. During this movement, the sliding pin 56 continues to slide up the slot 54 in the mounting plate 54 so the bridge plate 40 can remain in its lowered horizontal position while the platform 18 tilts up relative to the vehicle and the bridge plate 40.

During lowering of the lift, the lifting assembly 16 is powered outboard and downwards from its stowed position towards the raised position shown in FIG. 4a. During this movement the platform 18 rotates downwards under its own weight under the control of the first link 36 as the pivot axis 17 moves away from the lower lifting arm 30 and so the bottom of the first link 36 can move upwards relative to the pivot axis 17. Further lowering of the lift from its raised position moves the platform and hence the lower end of the first link 36 away from the lower lift arm 30 which allows the first link 36 to extend. The upward movement of the mounting plate 52 relative to the platform 18 lifts the upper end of the bridge plate control link 46, which in turn lifts the bridge plate 40 towards its raised position. Referring to FIG. 3b, as the bridge plate 40 approaches its raised position, the latch pin 50 engages with the curved outer surface 60d of the latch hook 60 which lifts the latch hook 60, against the force of the latch return spring 59. Continued lowering of the lift causes the latch hook 60 to ride over the pin 50 pushing the latch release tab 62 under the latch release member 66. Finally, further lowering of the lift allows the first link 36 to extend to its maximum extended length, which moves the latch release member 66 upwards allowing the latch hook 60 to drop down under the force of the latch return spring 59 into latching engagement with the latch pin 50 thereby latching the bridge plate 40 in its raised condition as shown in FIG. 1b. Further lowering of the lift causes the platform folding linkage 34 to move away from the lower lifting arm 30 and lowers the lift platform 18 to its fully lowered position with the bridge plate latched securely in its raised position.

Figure 5:
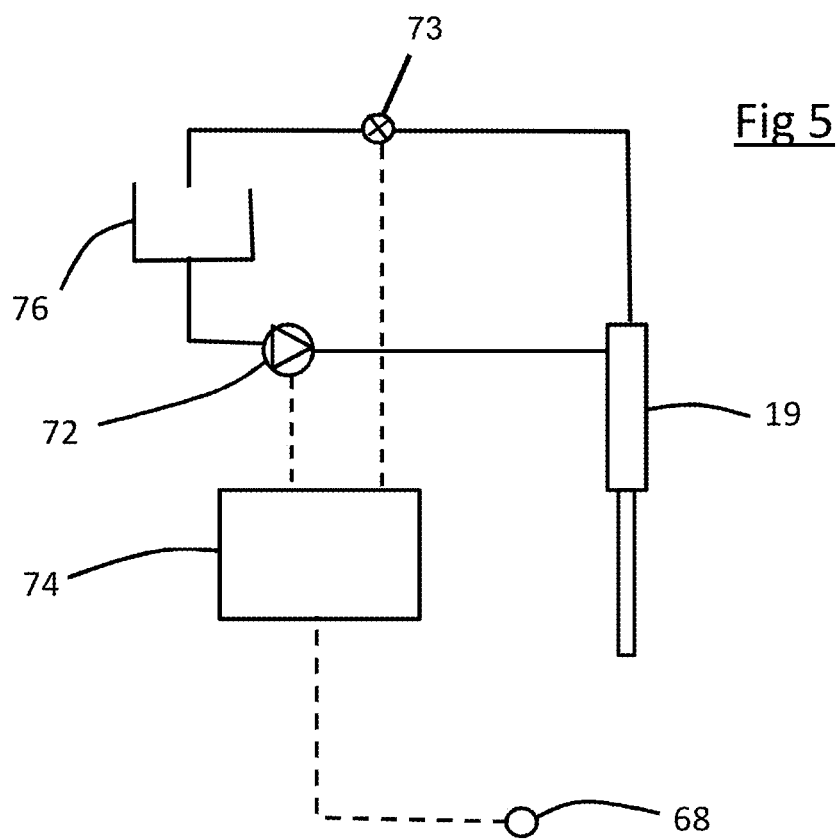
FIG. 5 is a schematic diagram of the control system for the wheelchair lift of FIGS. 1a and 1b.

Referring to FIG. 5, the hydraulic struts 19 of the lifting assemblies are powered up and down by a hydraulic pump 72 and valves 73 under the control of a control unit 74. The pump 72 provides pressurized fluid from a reservoir 76 to the struts 19 to raise the lift and the valves 73 can be opened to allow the lift to lower. The control unit 74 is also connected to the bridge plate detector 68 so that the control unit can determine when the bridge plate is moved out of its fully raised position.

As described above, while the lift is being raised or lowered, and is at any point below the intermediate position where the bearing surface 38 on the platform folding linkage first contacts the underside of the lower lifting arm, the bridge plate is held in its fully raised position by the extending link 36. If at any point during that time the bridge plate is moved out of its fully raised position, for example because a wheelchair on the lift is pushing against it, the control unit 74 detects this by means of a sensor signal from the bridge plate detector 68, and responds by controlling the raising or lowering of the lift in an appropriate manner. For example, the control unit may be arranged to stop the raising or lowering of the lift on response to detection of such movement of the bridge plate 40. This allows a user to check the position of the wheelchair and move it, if necessary, before re-staring the lift. Alternatively, the control unit 74 may be arranged to slow movement of the lift on detection of movement of the bridge plate, or to reverse it under certain conditions, for example if the list has just started to be lifted from ground level. This provides an additional level of safety, in addition to the latch 48 which prevents the bridge plate from being pushed completely out of its raised condition.

It will be appreciated that while the bridge plate detector 68 works well in combination with a latch, such as the latch 48 described above, which allows a small amount of movement of the bridge plate out of its fully raised position but limits that movement to prevent the bridge plate from being pushed out of its raised condition, the detector can be used in a system which does not include such a bridge plate latch, but rather has a different type of bridge plate locking or latching mechanism or indeed no lock or latch mechanism at all.

Similarly, the latch 48 is designed to allow some movement of the bridge plate away from its fully raised position before the latch stops movement of the bridge plate, so as to allow that movement to be detected. However, in other embodiments the detector is not used, in which case the latch may secure the bridge plate in its fully raised position, and prevent any, or any effective, movement out of that position.

In the foregoing specification, the invention has been described with reference to specific embodiments thereof. While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A wheelchair lift for a vehicle, the wheelchair lift comprising:

a base for securing to a vehicle;

a platform, for accommodating a wheelchair, the platform being moveable between a raised position and a lowered position;

a lifting arm connected to the base and moveable between a raised position and a lowered position so as to move the platform between its raised position and its lowered position;

a support arm connected between the lifting arm and the platform;

a bridge plate connected to the platform and pivotable between a raised condition and a lowered condition;

a platform folding linkage connected to the platform and configured to contact the lifting arm during movement of the lifting arm between the raised position of the lifting arm and the lowered position of the lifting arm to raise the platform from a deployed position to a stowed position;

a bridge plate control link connected between the bridge plate and the platform folding linkage; and a latch pivotably mounted on the bridge plate control link and configured to latch the bridge plate in the raised condition.

2. A wheelchair lift according to claim 1 wherein the platform folding linkage comprises a first link pivotably connected to the platform and a second link pivotably connected to the support arm and to the first link, and wherein the bridge plate control link is connected to the first link.

3. A wheelchair lift according to claim 2 wherein the first link comprises a first part connected to the platform and a second part configured to move relative to the first part and connected to the second link.

4. A wheelchair lift according to claim 3 wherein the bridge plate control link is connected to the first part of the first link whereby movement of the first part relative to the second part allows the bridge plate to move relative to the platform between its raised and lowered conditions.

5. A wheelchair lift according to claim 3 further comprising a latch release member mounted on the first part of the first link and configured to release the latch on movement of the first part relative to the second part.

6. A wheelchair lift according to claim 1 wherein the bridge plate control link is connected to the platform folding linkage by means of a sliding connection.

7. A wheelchair lift according to claim 6 wherein the sliding connection is configured to allow movement of the latch release member relative to the latch when the first part of the first link moves relative to the second part of the first link.

8. A wheelchair lift according to claim 6 wherein the lifting arm is further movable to a stowed position so as to move the platform to its stowed position, and the sliding connection allows the platform to rotate relative to the bridge plate as the platform folding linkage raises the platform from its deployed position towards its stowed position.

9. A wheelchair lift according claim 1 wherein the bridge plate, while in its raised condition, is movable between a fully raised position and a latched position in which the latch prevents its further movement away from the fully raised position.

10. A wheelchair lift according to claim 9 further comprising a detector configured to detect movement of the bridge plate out of its fully raised position and a control unit connected to the detector, and configured to control movement of the platform between its raised position and its lowered position, and further configured, on detection of movement of the bridge plate out of its fully raised position, to modify its control of said movement of the platform between its raised position and its lowered position.

11. A wheelchair lift for a vehicle, the wheelchair lift comprising:

a base for securing to a vehicle;

a platform for accommodating a wheelchair;

a lifting arm connected to the base and moveable between a raised position and a lowered position so as to move the platform between a raised position and a lowered position;

a support arm connected between the lifting arm and the platform;

a bridge plate connected to the platform and pivotable between a raised position and a lowered position;

a latch configured to limit movement of the bridge plate away from the raised position by preventing it from moving past a latched position;

a spring urging the bridge plate towards the raised position;

a detector configured to detect movement of the bridge plate out of its raised position into its latched position; and a control unit connected to the detector, configured to control movement of the lifting arm between its raised position and its lowered position, and further configured, on detection of movement of the bridge plate out of its raised position into its latched position, to modify its control of said movement of the lifting arm between its raised position and its lowered position.

12. A wheelchair lift according to claim 11 wherein, on detection of movement of the bridge plate out of its raised position into its latched position, the control unit is configured to stop movement of the lift.

* * * * *